United States Patent [19]

Mattei et al.

[11] Patent Number: 5,105,833
[45] Date of Patent: Apr. 21, 1992

[54] DEVICE FOR PERFORATING VENTILATION HOLES IN CIGARETTES OR SIMILAR

[75] Inventors: Riccardo Mattei; Armando Neri, both of Bologna; Santo R. Gobbi, Arena Po; Maichi Cantello, Aglie, all of Italy

[73] Assignee: G. D. Societa' Per Azioni, Bologna, Italy

[21] Appl. No.: 534,486

[22] Filed: Jun. 7, 1990

[30] Foreign Application Priority Data

Jun. 13, 1989 [IT] Italy .................................. 3516 A/89

[51] Int. Cl.⁵ .............................................. A24C 5/60
[52] U.S. Cl. ................................. 131/281; 219/121.7; 219/121.76; 219/121.78
[58] Field of Search ...................... 131/281; 219/121.6, 219/121.61, 121.62, 121.67, 121.7, 121.74, 121.75, 121.78, 121.8, 121.76

[56] References Cited

U.S. PATENT DOCUMENTS 4,524,785  6/1985  Sevagnoli ........................... 131/281
4,633,891  1/1987  Mattei et al. .
4,720,619  1/1988  Mattei et al. ........................ 131/281

Primary Examiner—V. Millin
Attorney, Agent, or Firm—Marshall, O'Toole, Gerstein, Murray & Bicknell

[57] ABSTRACT

A perforating device for forming holes in cigarettes or similar items, whereby a laser beam, emitted by a laser source, is directed on to the cigarettes, engaged inside respective seats, by means of a mobile reflecting and focusing unit mounted for rotation about an axis, and a rotary reflecting element located on the aforementioned axis; the cigarettes turning about their axis and being conveyed transversely in relation to the same on a drum turning about the axis of the beam at the same speed as the rotary reflector; the drum having a speed different from the speed of the mobile unit and the ratio of the mobile unit speed and the drum speed is substantially, but not exactly, a multiple of said first speed; the mobile unit receiving the beam coaxially with the beam axis and deflecting it first outwards and then towards the beam axis; the focused beam being again deflected outwards towards the cigarettes by a ring of mirrors carried on the rotary reflecting element and equal in number to the seats on the drum.

8 Claims, 3 Drawing Sheets

DEVICE FOR PERFORATING VENTILATION HOLES IN CIGARETTES OR SIMILAR

BACKGROUND OF THE INVENTION

The present invention relates to a device for perforating ventilation holes in cigarettes or similar. For producing so-called "ventilated" cigarettes, perforating devices are known to be employed, the "piercing" tool of which consists of a laser source. Italian Patent No. 1.168.682 filed on 12 Sep. 1983 by G. D. S.p.A. relates to a device for perforating ventilation holes in cigarettes supported inside respective seats mounted for rotation on a conveyor drum turning about its axis U.S. Pat. No. 4,633,891 corresponds to the Italian patent.

According to said Italian Patent, the perforating device comprises a laser source for emitting a laser beam along the rotation axis of the conveyor drum; and an optical reflecting and focusing system for directing and focusing the beam emitted by the laser source on to specific surface points of each cigarette as this turns about its axis inside the respective said seat.

For this purpose, the optical system comprises a mobile unit turning about the rotation axis of the conveyor drum and in turn comprising two mirrors, a first of which is located on said rotation axis for directing the beam outwards, and a second of which receives the beam reflected by the first and directs it inwards towards said rotation axis and on to a fixed reflecting element. The reflecting element presents a ring of mirrors equally spaced about the rotation axis of the conveyor drum, for successively intercepting the beam and directing it outwards on to the cigarettes.

Prior to reaching the fixed reflecting element, the beam deflected inwards by the second mirror passes through a focusing lens which, in the absence of the reflecting element, would focus the beam deflected by the second mirror on to the same point on the rotation axis of the drum.

On the known device described above, the speed ratio of the drum and mobile unit is so fixed that one full turn of the mobile unit about is axis corresponds to a one-step displacement of the cigarettes, i.e. the distance between two adjacent cigarettes on the conveyor drum. Consequently, if n is the number of holes to be perforated in each cigarette, the cigarettes are perforated as they are fed by the drum over an arc of n steps in length, along which arc each cigarette makes one full turn about its axis by virtue of the motion imparted by the rotary seat in which it is housed.

The reflecting element presents n mirrors arranged over an arc the center angle of which coincides with that of the perforating arc.

For each complete turn of the mobile unit about its axis, the above device perforates a hole in each cigarette on the perforating arc, so that, on exiting said arc, each cigarette presents a ring of n holes equally spaced about its circumference.

This conforms with a well-known optical law whereby, if a beam is focused on to a given point by a focusing device, and said point remains stationary despite said focusing device being moved along an given trajectory, any deflection of the focused beam results in the formation of a "reflected focus" which, like the original, remains stationary alongside a change in position of the focusing device.

If the known perforating device described above is examined in the light of the above principle and the fact that, in the absence of the mirrors on the reflecting element, the beam is focused on to the same fixed point on the axis of rotation of the drum, it follows that, via the interposition of a mirror on the reflecting element, the beam is focused on to a further point, which remains stationary for as long as it takes the beam to sweep the mirror, and then moves rapidly on to a further fixed point as the beam begins to sweep the next mirror on the reflecting element.

On the known device described above, the beam is thus "pulsated" by the mirrors on the reflecting element, the effect of which is to cyclically locate the beam focus on the n reflected focuses arrange over and in a fixed position in relation to the perforating arc.

If a strict speed ratio is maintained between the conveyor drum and mobile unit so that, as already stated, a complete turn of the mobile unit corresponds to one-step displacement of the drum, and if the drum is so "timed" to the mobile unit that, when produced, each of said reflected focuses coincides with a surface point on a respective cigarette, the known device described above provides, at each reflected focus, for perforating the surface of the cigarette currently coinciding with the position of said reflected focus.

As each cigarette moves through all the said points as it travels over the perforating arc, a total of n holes are perforated by the time the cigarette exits the perforating arc.

Moreover, as each cigarette, as it travels over the perforating arc, makes a complete turn about its axis at constant speed, said holes are equally distributed about the circumference of the cigarette.

Clearly, therefore, the perforating system referred to in Italian Patent No. 1.168.682 is extremely rigid, in that the number of holes to be perforated in each cigarette, depending as it does on the number of mirrors on the fixed reflecting element, must be determined beforehand, and a strict speed ratio, both in terms of absolute speed and timing, must be maintained between the mobile unit and drum. In fact, even the slightest variation in said speed ratio in the formation of reflected focuses not coinciding with respective surface points on the cigarettes and, consequently, in total inefficiency of the perforating system as a whole.

SUMMARY OF THE INVENTION

The aim of the present invention is to perfect the known perforating device described above, so as to render it perfectly flexible.

In particular, the aim of the present invention is to perfect the known perforating device described above, so as to enable the required number of holes to be varied at any time, without replacing any of the component parts of the device, in particular the reflecting element.

With this aim in view, according to the present invention, there is provided a perforating device for forming ventilation holes in cigarettes or similar items, said device comprising a drum for conveying said items and turning about a first axis at a first speed; a number of seats equally spaced about said drum and each designed to retain a respective said item and each turning about a second axis in relation to said drum; a laser source; and an optical reflecting and focusing unit for deflecting and focusing the beam emitted by said source on to given surface points of each said item; said laser source being designed to emit said beam along said first axis; and said optical unit comprising at least a mobile unit turning about said first axis at a second speed and comprising a focusing element or lens, said mobile unit being designed to deflect said beam towards said first axis, and a reflecting element having a ring of mirrors arranged about said first axis and designed to successively intercept said focused beam and deflect the same outwards on to said items; characterised by the fact that said reflecting element is mounted for rotation about said first axis at said first speed; each said mirror on said reflecting element corresponding to a respective said seat; and said second and first speeds presenting a ratio variable as required and as a direct function of the number of holes to be perforated in each said item. More specifically, the drum can have a speed different from the speed of the mobile unit and the ratio of the mobile unit speed and the drum speed can be substantially, but not exactly, a multiple of said first speed; ——.

BRIEF DESCRIPTION OF THE DRAWINGS

A number of non-limiting embodiments of the present invention will be described by way of examples with reference to the accompanying drawings, in which.

DETAILED DESCRIPTION OF THE INVENTION

Figure 1:
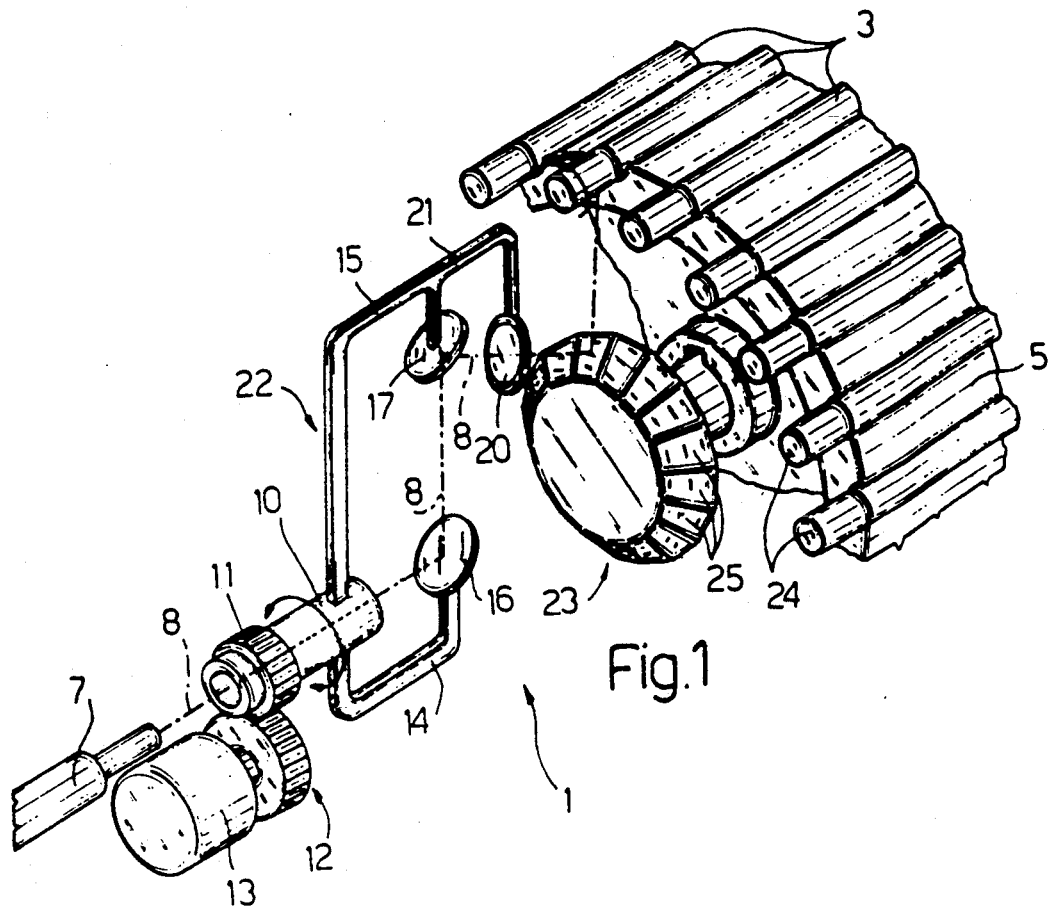
FIG. 1 shows a schematic view in perspective of a preferred embodiment of a perforating device in accordance with the present invention.
Figure 2:
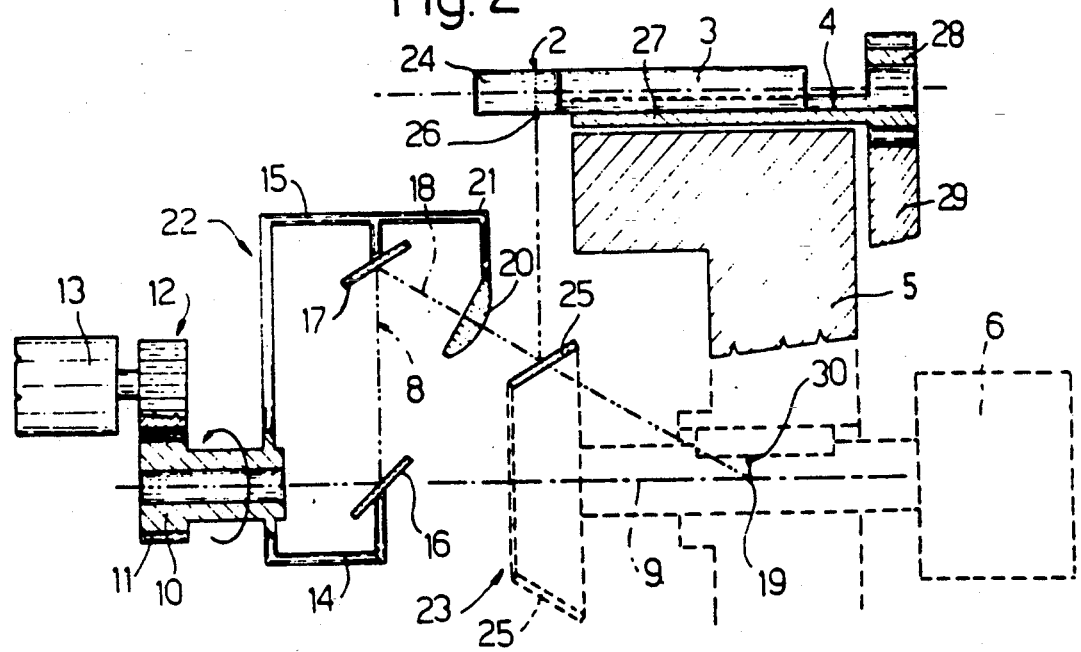
FIG. 2 shows a partially-sectioned side view of the FIG. 1 device.

Number 1 in FIGS. 1 and 2 indicates a perforating unit or device for forming a ring of holes or perforations 2 (FIG. 2) in a number of cigarettes 3. Each cigarette 3 is housed partially inside a respective seat 4 on the periphery of a conveyor drum 5 turned by a motor 6 about its own axis at a first, preferably constant, speed.

In addition to drum 5, device 1 also comprises a preferably continuous laser source 7 designed to emit a beam 8 along an axis 9 coinciding with the rotation axis of drum 5.

Device 1 also comprises a tubular body 10 mounted for rotation about its own axis coinciding with axis 9. Tubular body 10 presents an outer ring gear 11 meshing with the output drive 12 of a motor 13 for driving tubular body 10 at a second speed adjustable as required.

From the end of body 10 facing drum 5, there extend two arms 14 and 15 supporting respective mirrors 16 and 17, mirror 16 being designed to intercept beam 8 from body 10 and deflect it outwards on to mirror 17 in a direction substantially perpendicular to axis 9.

As shown in FIG. 2, mirror 17 is so oriented as to deflect beam 8 along an axis 18 intersecting axis 9 at point 19. Said axis 18 coincides with the optical axis of a focusing lens 20 supported on an arm 21 integral with arm 15, and designed to focus beam at a point or focus which, if the focused beam were not deflected further, would coincide with point 19 regardless of the position assumed about axis 9 by a mobile unit indicated as a whole by 22 and comprising tubular body 10, arms 14, 15 and 21, mirrors 16 and 17 and lens 20.

Device 1 also comprises a reflecting element 23 in the form of a truncated pyramid, located coaxial with axis 9 with its apex facing tubular body 10.

Reflecting element 23 is connected to motor 6 so as to turn about axis 9 at the same speed as drum 5, and presents n faces equal in number to seats 4 and each assigned to a filter 24 of a respective cigarette 3 projecting from drum 5.

Each face of reflecting element 23 presents a reflecting surface or mirror 25 facing respective filter 24 and which, when struck by focused beam 8 from lens 20, reflects the same substantially radially outwards so as to form a reflected focus 26 on the surface of respective filter 24.

As shown in FIG. 2, each seat 4 is formed on a respective gondola 27 arranged parallel to axis 9 and connected in rotary manner to drum 5. Each gondola 27 is fitted with a coaxial gear 28 meshing with a ring gear 29 connected in known manner to motor 6 via a drive (not down) so as to rotate, in relation to drum 5, about axis 9 and so turn cigarettes 3 about their axes as they are fed forward on drum 5.

In actual use, filters 24 are perforated as cigarettes 3 are fed forward trnasversely, at said first speed, over a given perforating arc of less than 360° and normally extending between a loading position (not shown) wherein cigarettes 3 are loaded on to drum 5, and an unloading position (not shown) wherein the perforated cigarettes 3 are unloaded off drum 5. Drum 5 is of the type described and illustrated in Italian Patent No. 1.181.265, the content of which is fully included herein.

As described in the above Italian Patent, cigarettes 3 are fed transversely over the perforating arc, while at the same time rotating at constant speed and making, over said arc, a given finite number of complete turns about their respective axes.

During perforation, mobile unit 22 is turned about axis 9 in the same direction but at a higher absolute speed than drum 5, said speed increasing in proportion to the number of holes 2 required in each cigarette 3.

That is to say, assuming the perforating arc is 240°, that each cigarette 3 makes two complete turns about its axis as it travels over said arc, and twenty holes are required in each cigarette 3, in this case, mobile unit 22 must be turned at "approximately" thirty times the speed of drum 5.

When operated as described above, for each complete turn of mobile unit 22 about it axis, device 1 therefore perforates one hole 2 in each cigarette 3 on the perforating arc, so that, on exiting the arc, each cigarette 3 presents a ring of twenty holes 2 equally spaced about the circumference of filter 24. As each cigarette 3, however, makes two complete turns about its axis as it travels over the perforating arc, said ring of holes 2 actually consists of a first and second ring of coplanar holes 2. Clearly therefore, if the speed ratio of mobile unit 22 and drum 5 were to comply exactly with the required theoretical ratio, the holes in said second ring would be superimposed on those of said first ring, with the result that each cigarette 3 would present, not the required twenty holes, but only ten perforated twice over.

To avoid this drawback, said speed ratio is set very close, but never exactly equal, to the required theoretical ratio, so as to slightly offset the holes in said two (or more) rings.

The optical law referred to previously may serve to make this clearer: if a beam is focused on to a given point by means of a focusing device, and said point remains stationary despite the focusing device being moved along any given trajectory, any deflection of said focused beam by means of a fixed mirror results in the formation of a reflected focus which, like the original, remains stationary alongside a change in position of the focusing device.

Similarly, if deflection is effected by means of a mirror turning about an axis at constant speed, the reflected focus, instead of remaining stationary, will also turn about said axis at the same speed as the respective deflecting mirror.

If device 1 is examined in the light of the above principles and the fact that, in the absence of mirrors 25, beam 8 would be focused permanently on to fixed point 19, it follows that, by interposing a mirror 25, beam 8 is focused on to a point 26 on the surface of filter 24 of cigarette 3 relative to said mirror 25. As mirror 25 turns about axis 9 at the same speed as drum 5 and, consequently, cigarettes 3, said point 26 also turns at the same speed about axis 9, remaining substantially stationary in relation to respective cigarette 3 for as long as it takes beam 8 to sweep said mirror 25, and then moves rapidly to a further point 26 on the surface of adjacent cigarette 3 as beam 8 commences to sweep the next mirror 25.

In other words, beam 8 is "pulsated" by mirrors 25, the effect of which is to cyclically locate the focus of beam 8 on to n points distributed over the perforating arc, equal in number to cigarettes 3 on said arc, located on the surface of filters 24 of respective cigarettes 3 on said arc, and moving the cigarettes 3 over respective arc portions at most equal in length to the distance between adjacent cigarettes 3.

For each complete turn of mobile unit 22 about axis 9, device 1 therefore provides for perforating one hole 2 at each said point traveling with respective cigarette 3 over the perforating arc.

Though each point 26 does in fact accompany respective cigarette 3 over a portion of its rotation by drum 5 about axis 9, it must be remembered that, as it turns about axis 9, each cigarette 3 also continues turning about its own axis. Consequently, said point 26 does not remain perfectly stationary in relation to the surface of cigarette 3, but travels over an arc equal to that traveled by a point on the surface of cigarette 3 about the axis of the same within the time taken by drum 5 to feed cigarettes 3 one step forward, thus resulting in the formation of slightly elongated holes 2.

To overcome this drawback and ensure that, throughout perforation of each hole 2, each point 26 also accompanies cigarette 3 as it turns about its own axis, the angle of both mirror 17 and the focal axis of lens 20 is so modified as to define, in the absence of mirrors 25, a focus 30 located a given distance from axis 9.

Subsequent to rotation of mobile unit 22, focus 30, unlike focus 19 which remains stationary, turns about a circumference having its center on axis 9. Similarly, for as long as focused beam 8 sweeps any one of mirrors 25, reflected focus 26 also moves in space, according to a complex law based on the superposition of two motions, the first being said circular motion about axis 9, and the second a second circular motion about substantially superimposed on the first and performed at a speed substantially proportional to the radius of the circumference about which focus 30 travels.

Figure 3:
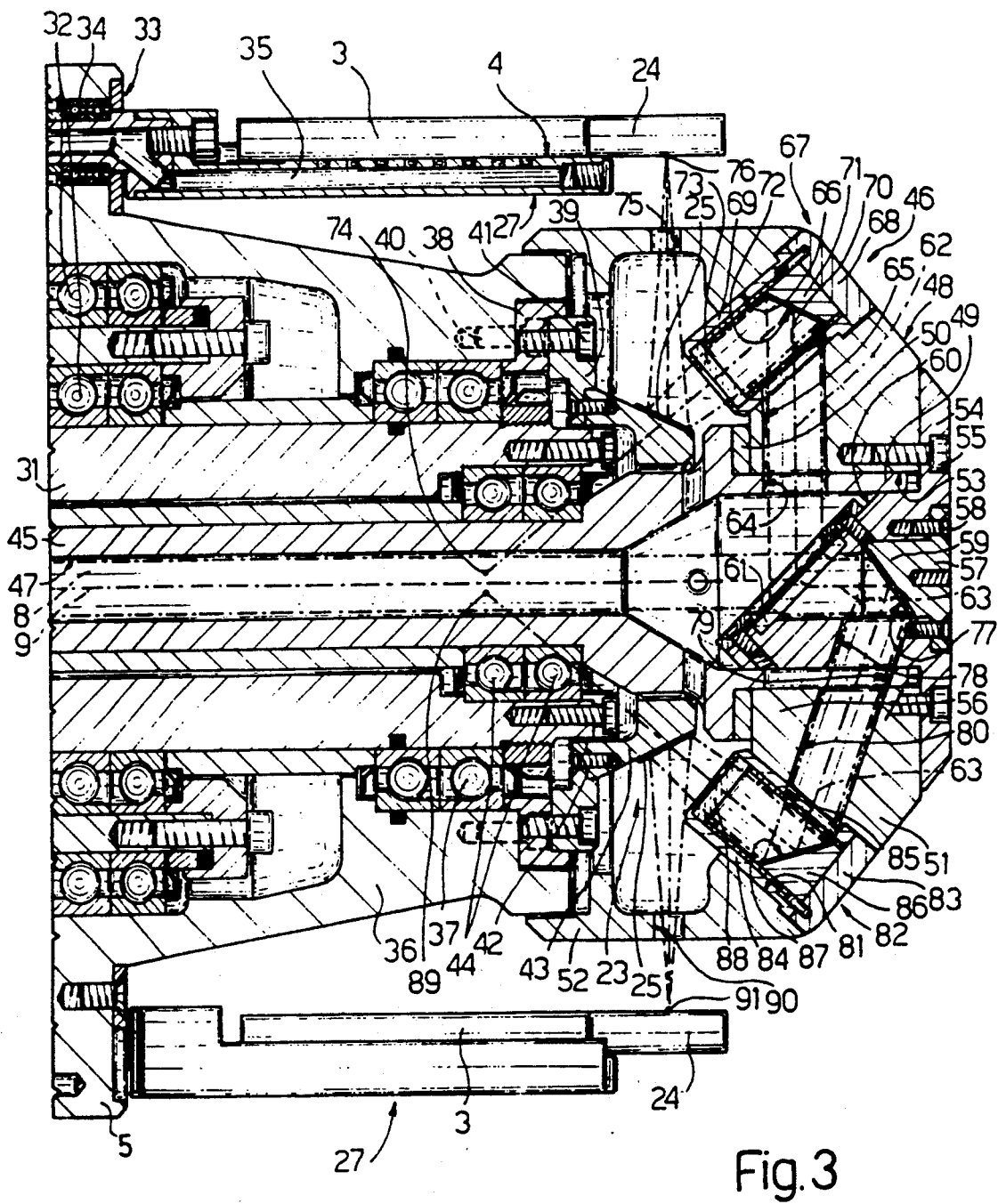
FIG. 3 shows a cross section of a first preferred embodiment of a detail on the FIG. 1 device.
Figure 4:
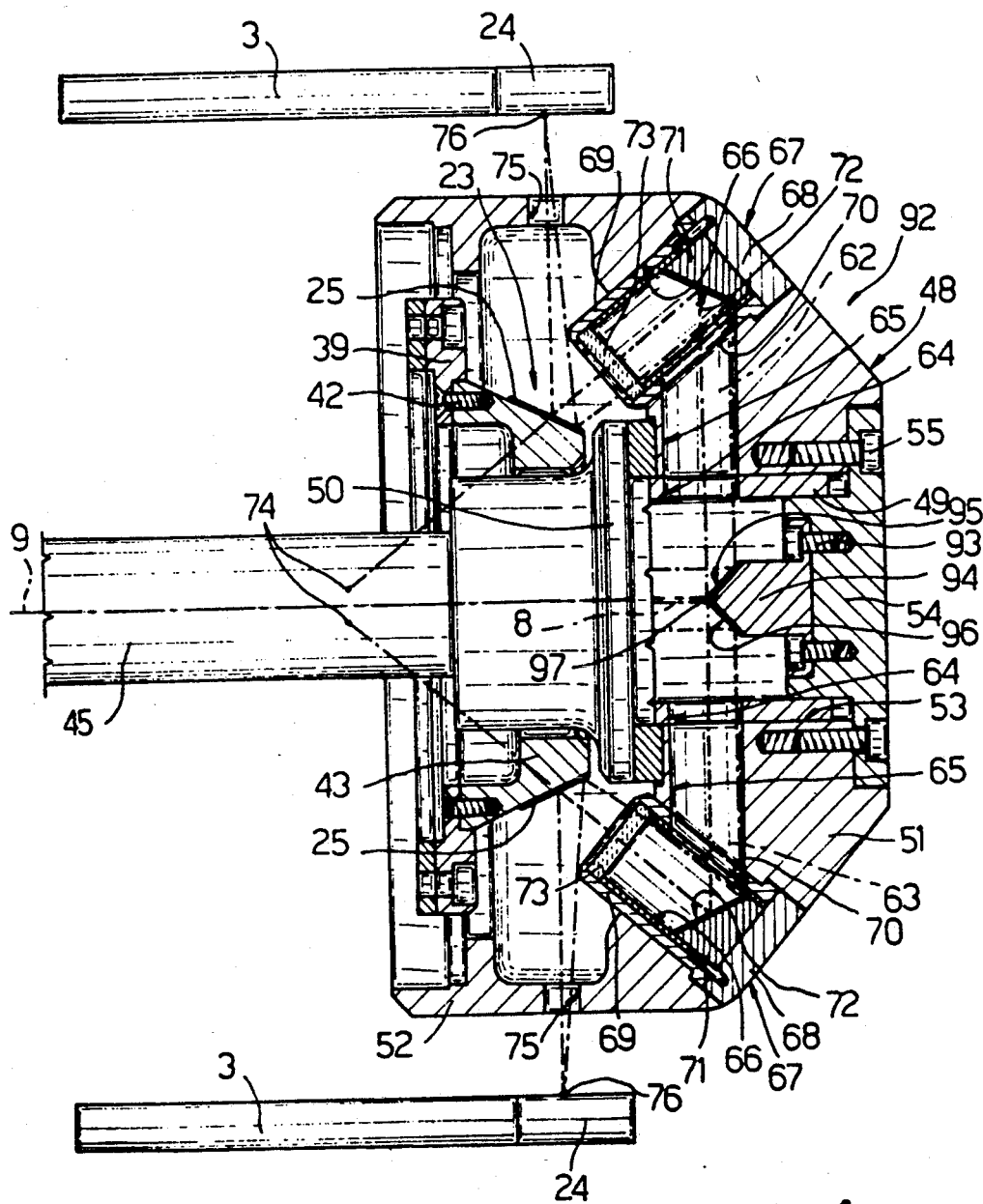
FIG. 4 shows a cross section of a variation of the FIG. 3 detail.

By appropriately calculating said radius, it is therefore possible, for each mirror 25, to ensure that reflected focus 26 accompanies respective cigarette 3 throughout the perforation of hole 2, thus enabling the formation of substantially perfectly round holes 2. FIGS. 3 and 4 show two practical embodiments of device 1 as illustrated in FIGS. 1 and 2.

As shown in FIG. 3, drum 5 is fitted through with a fixed tubular supporting shaft 31, the axis of which coincides with axis 9, and which is connected in rotary manner to drum 5 via the interposition of bearings 32. Gondolas 27 project from a front end surface 33 of drum 5, and are connected in rotary manner to drum 5 via the interposition of respective bearings 34.

Each gondola 27 presents an internal suction device 35 for retaining respective cigarette 3 inside seat 4, and extends outwards of a tubular bell 36 extending forward from surface 33, integral with drum 5, and fitted through with fixed tubular shaft 31 to which it is connected in rotary manner via the interposition of a bearing 37.

Via the interposition of two annular spacers 38 and 39, and by means of three sets of screws 40, 41 and 42, the front end of bell 36 is fitted integral with an annular body 43 shaped externally in the form of a truncated pyramid, located to the front of the front end of fixed tubular shaft 31, coaxial with axis 9, and constituting reflecting element 23 having external mirrors 25 equal in number to and respectively facing gondolas 27.

Fixed tubular shaft 31 houses, in rotary manner and via the interposition of bearings 44, a tubular shaft 45 coaxial with axis 9, corresponding to tubular body 10 in FIGS. 1 and 2, and supporting a head 46 projecting frontwards of the front end of bell 36 and corresponding to mobile unit 22 in FIGS. 1 and 2.

As described with reference to FIGS. 1 and 2, drum 5 in FIG. 3 is connected to motor 6 (not shown) so as to turn, together with annular body 43, about axis 9 at a first substantially constant speed; whereas shaft 45 is connected to motor 13 (not shown, and located in this case on the same side as motor 6 in relation to drum 5) so as to turn about axis 9 at a second speed adjustable as required, and which is increased, in relation to said first speed, in proportion to the number of holes 2 required in each cigarette 3.

In the FIG. 3 embodiment, laser source 7 (not shown) is also located on the same side as motors 6 and 13 in relation to drum 5, and emits a beam 8 extending along an axial duct 47 in shaft 45, and through annular body 43 into head 46.

Head 46 comprises a cup-shaped body 48 mounted on a cylindrical end portion 49 of shaft 45 projecting beyond the front end of bell 36 and defined rearwards by an annular outer flange 50. Body 48 is located with its concave side facing bell 36, and comprises an end wall 51 perpendicular to axis 9, and a cylindrical side wall 52 connected in rotary manner to a front end portion of the outer surface of bell 36. Wall 51 presents a central through hole 53 inside which portion 49 of shaft 45 is fitted.

The front end of hole 53 is closed by a cover 54 secured to the front surface of wall 51 by means of screws 55 and having a tubular appendix 56 extending inside portion 49 and closed at the front by a cap 57 secured to cover 54 by means of screws 58 and having an appendix 59 engaging tubular appendix 56.

Tubular appendix 56 is defined rearwards by an annular surface 60 located inside portion 49, at 45° in relation to axis 9, and fitted with a semitransparent mirror 61 for dividing beam 8 into two identical beams 62 and 63. As regards beam 62, mirror 61 is equivalent to mirror 16 in FIGS. 1 and 2, and provides for deflecting beam 62 radially outwards through a first radial hole 64 in portion 49, and a second hole 65 coaxial with hole 64 and formed through wall 51. Hole 65 terminates inside an oblique hole 66 formed through wall 51 in the direction of mirrors 25 on annular body 43. Hole 66 is engaged by a hollow cap 67 comprising a front end wall 68 and a cylindrical side wall 69 having lateral hole 70 coinciding with hole 66. Wall 68 is fitted with an appendix 71 extending inside wall 69 and defined by an inclined mirror surface 72. As regards beam 62, said surface 72 is equivalent to mirror 17 in FIGS. 1 and 2, and provides for receiving and deflecting beam 62 towards axis 9 through a focusing lens 73, which, as regards beam 62, is equivalent to lens 20 in FIGS. 1 and 2.

If not intercepted successively by mirrors 25 on annular body 43, focused beam 62 would be focused by leans 73 on to a point 74 relatively close to axis 9 and corresponding to focus 30 in FIG. 2. As already stated in connection with the FIG. 1 and 2 device, each mirror 25 reflects beam 62 radially outwards through a radial hole 75 in wall 52, so as to form a reflected focus 76 located on the periphery of filter 24 of respective cigarette 3 and corresponding, as regards beam 62, to reflected focus 26 in FIGS. 1 and 2.

Appendix 59 terminates rearwards in a mirror surface 77 substantially perpendicular to surface 60 and which, as regards beam 63, is equivalent to mirror 16 in FIGS. 1 and 2, and provides for deflecting beam 63 outwards through hole a 78 in appendix 56, a hole 79 through portion 49, and a hole 80 coaxial with holes 78 and 79 and formed through wall 51. Hole 80 terminates inside an oblique hole 81 formed through wall 51 in the direction of mirrors 25 on annular body 43. Hole 81 is engaged by a hollow cap 82 comprising a front end wall 83 and a cylindrical side wall 84 having a lateral hole 85 coinciding with hole 81. Wall 83 is fitted with an appendix 86 extending inside wall 84 and defined by an inclined mirror surface 87 which, as regards beam 63, is equivalent to mirror 17 in FIGS. 1 and 2, and provides for receiving and deflecting beam 63 towards axis 9 through a focusing lens 88 which, as regards beam 63, is equivalent to lens 20 in FIGS. 1 and 2.

If not intercepted successively by mirrors 25 on annular body 43, focused beam 63 would be focused by lens 88 on to a point 89 relatively close to axis 9 and corresponding to focus 30 in FIG. 2. Each mirror 25 reflects beam 63 radially outwards through a radial hole 90 in wall 52, so as to form a reflected focus 91 located on the periphery of filter 24 of respective cigarette 3 and equivalent, as regards beam 63, to reflected focus 26 in FIGS. 1 and 2.

Head 46 thus operates in the same way as mobile unit 22, except that, in the case of head 46, two holes 2 are perforated simultaneously in two cigarettes 3. Consequently, the laser source connected to head 46 must be approximately twice as powerful as source 7 in FIGS. 1 and 2, while head 46, for a given number of holes 2 in cigarettes 3, must be turned at approximately half the speed of mobile unit 22.

The FIG. 4 embodiment relates to a head 92 consisting structurally of a top and bottom half identical to each other and to the top half of head 46 in FIG. 3. The component parts of each said half of head 92 are indicated using the same numbering system as for the top half of head 46.

The only difference between heads 92 and 46 is the manner in which beam 8 is divided into two identical beams 62 and 63. On head 92, the inner surface of cover 54 is fitted, by means of screws 93, with an axial appendix 94 extending, coaxially with axis 9, inside portion 49 of shaft 45, and terminating in two mirror surfaces 95 and 96. Said surfaces 95 and 96 are arranged at 90° to each other and at 45° in relation to axis 9, and intersect each other along a line 97 intersecting and perpendicular to axis 9. Said surfaces 95 and 96 correspond respectively to semitransparent mirror 61 and mirror surface 77 on head 46, and provide for dividing beam 8 into two beams 62 and 63.

It should be pointed out that the optical units on heads 46 and 92 corresponding to mirrors 16 and 17 and lens 20 in FIGS. 1 and 2 may be other than two in number. Each of heads 46 and 92 may, in fact, be fitted with only one said optical unit, or three or four similar units.

Moreover, when, as in the case of heads 46 and 92 described above, at least two said optical units are employed and cigarettes 3 make more than one complete turn about their axes over said perforating arc, the holes 2 perforated during the first and subsequent turns/s can be prevented from being superimposed by maintaining the speed ratio between shaft 45 and respective head 46 or 92 substantially, but not exactly, equal to that required for perforating the required number of holes. If, however, a relatively large number of holes 2 is required, the hole density at certain points on the periphery of filters 24 may be such as to excessively weaken the cover strip of the same.

This drawback is easily solved, however, by mounting the optical units on the head at slightly different angles, so that holes 2 perforated in filters 24 by the respective optical units are arranged, not in one ring, but in respective rings axially spaced along filters 24.

We claim:

1. A perforating device for forming ventilation holes (2) in cigarettes or similar items (3), said device comprising a drum (5) for conveying said items (3) and turning about a first axis (9) at a first speed; a number of seats (4) equally spaced about said drum (5) and each designed to retain a respective said item (3) and each turning about a second axis in relation to said drum (5); a laser source (7); and an optical reflecting and focusing unit (22, 23) for deflecting and focusing a beam (8) emitted by said source (7) on to given surface points of each said item (3); said laser source (7) being designed to emit said beam (8) along said first axis (9); and said optical unit (22, 23) (46, 23) (92, 23) comprising at least a mobile unit (22) (46) (92) turning about said first axis (9) at a second speed and comprising a focusing element (20) (73) (88), said mobile unit (22) (46) (92) being designed to deflect said beam (8) towards said first axis (9), and a reflecting element (23) having a ring of mirrors (25) arranged about said first axis (9) and designed to successively intercept said focused beam (8) and deflect the same outwards on to said items (3); characterised by the fact that said reflecting element (23) is mounted for rotation about said first axis (9) at said first speed; each said mirror (25) on said reflecting element (23) corresponding to a respective said seat (4); and said second and first speeds presenting a ratio variable as required and as a direct function of the number of holes (2) to be perforated in each said item (3).

2. A device as claimed in claim 1, characterised by the fact that said second speed is substantially, but not exactly, equal to a multiple of said first speed.

3. A device as claimed in claim 1, characterised by the fact that said mobile unit (22) (46) (92) comprises at least a pair of mirrors (16, 17) (61, 72; 77, 87) (95, 72; 96, 72), a first (16) (61;77) (95; 96) of which is located on said first axis (9) for deflecting at least part of said beam (8) outwards, and a second (17) (72; 87) (72) of which is designed to receive the beam (8) (62) (63) reflected by the first and deflect it towards said first axis (9); said mobile unit (22) (46) (92) also comprising a focusing element (20) (73, 88) (73) assigned to said pair of mirrors.

4. A perforating device for forming ventilation holes (2) in cigarettes or similar item (3), said device comprising a drum (5) for conveying said item (3) and turning about a first axis (9) at a first speed;

a number of seats (4) equally spaced about said drum (5) and each designed to retain a respective said item (3) and each turning about a second axis in relation to said drum (5);

a laser source (7);

an optical reflecting and focusing unit (22,23) for deflecting and focusing a beam (8) emitted by said source (7) onto given surface points of each said item (3);

said laser source (7) being designed to emit said beam (8) along the first axis (9);

said optical unit (22,23) (46,23) (92,23) comprising at least a mobile unit (22) (46) (92) turning about the first axis (9) at a second speed and comprising a focusing lens (20) (73) (88), said mobile unit (22) (46) (92) being designed to deflect said beam (8) towards the first axis (9), and a reflecting element (23) having a ring of mirrors (25) arranged about the first axis (9) and designed to successively intercept said focused beam (8) and deflect the same outwards onto said items (3);

the focusing lens (20) (73,88) (73) being located between said second mirror (17) (72,87) (72) and said reflecting element (23);

the reflecting element (23) being mounted for rotation about the first axis (9) at said first speed;

each mirror (25) on the reflecting element (23) corresponding to a respective seat (4);

the second and first speeds presenting a ratio variable as required and as a direct function of the number of holes (2) to be perforated in each item (3);

the mobile unit (22) (46) (92) comprising at least a pair of mirrors (16,17) (61,72; 77,87) (95,72; 96,72), a first (16) (61,77) (95,96) of which is located on the first axis (9) for deflecting at least part of the beam (8) outwards, and a second (17) (72,87) (72) of which is designed to receive the beam (8) (62) (63) reflected by the first and deflect it towards the first axis (9);

the mobile unit (22) (46) (92) also comprising a focusing lens (20) (73,88) (73) assigned to the pair of mirrors; and means (61) (94) for dividing the beam (8) emitted by said source (7) along the first axis (9) into at least two identical beams (62,63), each interfering with a respective pair of mirrors and traveling through a respective focusing lens.

5. A device as claimed in claim 4, characterised by the fact that said dividing means comprise a semitransparent mirror (61).

6. A device as claimed in claim 4, characterised by the fact that said dividing means comprise two mirror elements (95, 96) arrange perpendicular to each other and extending at 45° in relation to said first axis (9); said two mirror elements (95, 96) intersecting each other along a line (97) perpendicular to said first axis (9).

7. A perforating device for forming ventilation holes (2) in cigarettes or similar items (3), said device comprising a drum (5) for conveying said items (3) and turning about a first axis (9) at a first speed;

a number of seats (4) equally spaced about said drum (5) and each designed to retain a respective said item (3) and each turning about a second axis in relation to said drum (5);

a laser source (7);

an optical reflecting and focusing unit (22,23) for deflecting and focusing a beam (8) emitted by said source (7) onto given surface points of each said item (3);

said laser source (7) being designed to emit said beam (8) along the first axis (9);

said optical unit (22,23) (46,23) (92,23) comprising at least a mobile unit (22) (46) (92) turning about the first axis (9) at a second speed and comprising a focusing leans (20) (73) (88), said mobile unit (22) (46) (92) being designed to deflect said beam (8) towards the first axis (9), and a reflecting element (23) having a ring of mirrors (25) arranged about the first axis (9) and designed to successively intercept said focus beam (8) and deflect the same outwards onto said items (3);

the reflecting element (23) being mounted for rotation about the first axis (9) at said first speed;

each mirror (25) on the reflecting element (23) corresponding to a respective seat (4);

the second and first speeds presenting a ratio variable as required and as a direct function of the number of holes (2) to be perforated in each item (3);

the mobile unit (22) (46) (92) comprising at least a pair of mirrors (16,17) (61,72; 77,87) (95,72; 96,72), a first (16) (61,77) (95,96) of which is located on the first axis (9) for deflecting at least part of the beam (8) outwards, and a second (17) (72,87) (72) of which is designed to receive the beam (8) (62) (63) reflected by the first and deflect it towards the first axis (9); and the mobile unit (22) (46) (92) also comprising a focusing lens (20) (73,88) (73) assigned to the pair of mirrors.

8. A perforating device for forming ventilation holes (2) in cigarettes or similar items (3), said device comprising a drum (5) for conveying said items (3) and turning about a first axis (9) at a first speed;

a number of seats (4) equally spaced about said drum (5) and each designed to retain a respective said item (3) and each turning about a second axis in relation to said drum (5);

a laser source (7);

an optical reflecting and focusing unit (22,23) for deflecting and focusing a beam (8) emitted by said source (7) onto given surface points of each said item (3);

said laser source (7) being designed to emit said beam (8) along the first axis (9);

said optical unit (22,23) (46,23) (92,23) comprising at least a mobile unit (22) (46) (92) turning about the first axis (9) at a second speed and comprising a focusing element (20) (73) (88), said mobile unit (22) (46) (92) being designed to deflect said beam (8) towards the first axis (9), and a reflecting element (23) having a ring of mirrors (25) arranged about the first axis (9) and designed to successively intercept said focuses beam (8) and deflect the same outwards onto said items (3);

the reflecting element (23) being mounted for rotation about the first axis (9) at said first speed;

each mirror (25) on the reflecting element (23) corresponding to a respective seat (4);

the second and first speeds presenting a ratio variable as required and as a direct function of the number of holes (2) to be perforated in each item (3);

the second speed being substantially, but not exactly, equal to a multiple of the first speed; and the second mirror (17) (72,87) (72) and the optical axis of the focusing element (20) (73,88) (73) being so arranged as to define, in the absence of the reflecting element (23), a focus (30) (74,89) (74) at a given distance from the first axis (9) and turning about the same with the mobile unit (22) (46) (92).

* * * * *